(12) United States Patent
Castellano et al.

(10) Patent No.: US 7,943,548 B2
(45) Date of Patent: May 17, 2011

(54) CATALYSTS TO REDUCE $NO_x$ IN AN EXHAUST GAS STREAM AND METHODS OF PREPARATION

(75) Inventors: Christopher R. Castellano, Ringoes, NJ (US); Ahmad Moini, Princeton, NJ (US); Gerald S. Koermer, Basking Ridge, NJ (US); Howard Furbeck, Hamilton, NJ (US); Steven J. Schmieg, Troy, MI (US); Richard J. Blint, Shelby Township, MI (US)

(73) Assignee: BASF Corporation, Florham Park, NJ (US)

( * ) Notice: Subject to any disclaimer, the term of this patent is extended or adjusted under 35 U.S.C. 154(b) by 636 days.

(21) Appl. No.: 11/533,593

(22) Filed: Sep. 20, 2006

(65) Prior Publication Data

US 2008/0070778 A1    Mar. 20, 2008

(51) Int. Cl.
*B01J 23/00* (2006.01)
*B01J 21/00* (2006.01)
*B01J 20/00* (2006.01)

(52) U.S. Cl. ........ 502/327; 502/330; 502/332; 502/334; 502/339; 502/348; 502/355; 502/415; 502/439

(58) Field of Classification Search .................. 502/327, 502/330, 332, 333, 334, 339, 347, 348, 355, 502/415, 439
See application file for complete search history.

(56) References Cited

U.S. PATENT DOCUMENTS

| | | | | |
|---|---|---|---|---|
| 3,378,334 A | * | 4/1968 | Bloch | 423/213.5 |
| 3,397,154 A | * | 8/1968 | Talsma | 502/304 |
| 3,953,368 A | * | 4/1976 | Sinfelt | 502/223 |
| 4,130,506 A | * | 12/1978 | Collier et al. | 252/1 |
| 4,229,319 A | * | 10/1980 | Antos | 502/230 |
| 4,322,458 A | | 3/1982 | Siebmanns | |
| 4,341,664 A | * | 7/1982 | Antos | 502/327 |
| 4,510,265 A | * | 4/1985 | Hartwig | 502/330 |
| 4,536,482 A | * | 8/1985 | Carcia | 502/5 |
| 4,539,308 A | | 9/1985 | Kukes et al. | |
| 5,489,565 A | * | 2/1996 | Cheung et al. | 502/325 |
| 5,593,933 A | | 1/1997 | Chattha | |
| 5,744,112 A | | 4/1998 | Irite et al. | |

(Continued)

FOREIGN PATENT DOCUMENTS

EP    0070736    1/1983

(Continued)

OTHER PUBLICATIONS

Nakatsuji, et al., "Catalytic Reduction System of NOx in exhaust gases from diesel engines with secondary fuel injection", *Applied Catalysis, B Environmental* (1998) 17(4), 333-345.

(Continued)

*Primary Examiner* — Cam N Nguyen
(74) *Attorney, Agent, or Firm* — Scott S. Servilla; Diehl Servilla LLC; Melanie L. Brown

(57) ABSTRACT

Catalysts, systems and methods are described to reduce $NO_x$ emissions of an internal combustion engine. In one embodiment, an emissions treatment system for an exhaust stream is provided having a catalyst comprising silver and a platinum group metal on a particulate alumina support, the atomic fraction of the platinum group metal being less than or equal to about 0.25. Methods of manufacturing catalysts are described in which silver is impregnated on alumina particles.

17 Claims, 4 Drawing Sheets

U.S. PATENT DOCUMENTS

| | | | |
|---|---|---|---|
| 5,880,196 | A | 3/1999 | Cho et al. |
| 5,977,012 | A | 11/1999 | Kharas et al. |
| 6,074,973 | A * | 6/2000 | Lampert et al. ............... 502/60 |
| 6,153,162 | A | 11/2000 | Fetzer et al. |
| 6,176,079 | B1 | 1/2001 | Konrad et al. |
| 7,611,680 | B2 * | 11/2009 | Jia et al. ............... 422/177 |
| 2005/0085380 | A1 | 4/2005 | Lockemeyer |
| 2005/0137083 | A1 | 6/2005 | Rocha |
| 2008/0069741 | A1 * | 3/2008 | Koermer et al. ............... 422/171 |
| 2008/0069743 | A1 | 3/2008 | Castellano et al. |

FOREIGN PATENT DOCUMENTS

| | | |
|---|---|---|
| EP | 0667182 | 8/1995 |
| WO | WO-97/22476 | 6/1997 |
| WO | WO-01/12320 | 2/2001 |

OTHER PUBLICATIONS

Takagi, et al., "Selective reduction of NO on Ag/Al2O3 catalysts prepared from boehmite needles", *Catalysis Today 43* (1998), 123-127.

Non-Final Office Action in U.S. Appl. No. 11/533,631, (Jun. 5, 2009), 18 pgs.

PCT IPRP and Written Opinion in PCT/US2007/079004, dated Apr. 2, 2009, 11 pp.

Non-Final Office Action in U.S. Appl. No. 11/533,631, (Dec. 17, 2008), 6 pgs.

Non-Final Office Action in U.S. Appl. No. 11/533,631, (May 13, 2008), 11 pgs.

\* cited by examiner

CATALYSTS TO REDUCE NO$_x$ IN AN EXHAUST GAS STREAM AND METHODS OF PREPARATION

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This invention pertains generally to exhaust emissions treatment systems and catalysts for internal combustion engines and methods for their manufacture and use with lean burn engines, including diesel engines and lean burn gasoline engines.

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. However, exhaust from lean burn gasoline engines is characterized by relatively high emissions of NO$_x$ as compared to conventional gasoline engines that operate at or close to stoichiometric air/fuel conditions. Effective abatement of NO$_x$ from lean burn engines is difficult to achieve because high NO$_x$ conversion rates typically require reductant-rich conditions. Conversion of the NO$_x$ component of exhaust streams to innocuous components generally requires specialized NO$_x$ abatement strategies for operation under fuel lean conditions.

Efficient reduction of nitrogen oxides (NO$_x$=NO+NO$_2$) from diesel and lean-burn gasoline exhaust is important to meet future emission standards and improve vehicle fuel economy. Reduction of NO$_x$ emissions from an exhaust feedstream containing excess oxygen to meet various regulatory requirements is a challenge for vehicle manufacturers. For example, it is estimated that compliance with Bin 5 regulations in the United States may require an after treatment system capable of 70-90% NO$_x$ conversion efficiency on the FTP (Federal Test Procedure) cycle based on currently anticipated engine-out NO$_x$ levels. One such strategy for the abatement of NO$_x$ in the exhaust stream from lean burn engines uses NO$_x$ storage reduction (NSR) catalysts, which are also known in the art as "NO$_x$ traps." NSR catalysts contain NO$_x$ sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to NO$_2$ (Equation 1), which is an important step for NO$_x$ storage. At low temperatures, this reaction is typically catalyzed by the platinum group metal component, e.g., a platinum component. The oxidation process does not stop here. Further oxidation of NO$_2$ to nitrate, with incorporation of an atomic oxygen, is also a catalyzed reaction (Equation 2). There is little nitrate formation in absence of the platinum group metal component even when NO$_2$ is used as the NO$_x$ source. The platinum group metal component has the dual functions of oxidation and reduction. For its reduction role, the platinum group metal component first catalyzes the release of NO$_x$ upon introduction of a reductant, e.g., CO (carbon monoxide) or HC (hydrocarbon) (Equation 3) to the exhaust. This step may recover some NO$_x$ storage sites but does not contribute to any reduction of NO$_x$ species. The released NO$_x$ is then further reduced to gaseous N$_2$ in a rich environment (Equations 4 and 5). NO$_x$ release can be induced by fuel injection even in a net oxidizing environment. However, the efficient reduction of released NO$_x$ by CO requires rich conditions. A temperature surge can also trigger NO$_x$ release because metal nitrate is less stable at higher temperatures. NO$_x$ trap catalysis is a cyclic operation. Metal compounds are believed to undergo a carbonate/nitrate conversion, as a dominant path, during lean/rich operations.

Oxidation of NO to NO$_2$ $$NO + \tfrac{1}{2}O_2 \rightarrow NO_2 \qquad (1)$$

NO$_x$ Storage as Nitrate $$2\,NO_2 + MCO_3 + \tfrac{1}{2}O_2 \rightarrow M(NO_3)_2 + CO_2 \qquad (2)$$

NO$_x$ Release $$M(NO_3)_2 + 2\,CO \rightarrow MCO_3 + NO_2 + NO + CO_2 \qquad (3)$$

NO$_x$ Reduction to N$_2$ $$NO_2 + CO \rightarrow NO + CO_2 \qquad (4)$$

$$2\,NO + 2\,CO \rightarrow N_2 + 2\,CO_2 \qquad (5)$$

In Equations 2 and 3, M represents a divalent metal cation. M can also be a monovalent or trivalent metal compound in which case the equations need to be rebalanced.

While the reduction of NO and NO$_2$ to N$_2$ occurs in the presence of the NSR catalyst during the rich period, it has been observed that ammonia (NH$_3$) can also form as a by-product of a rich pulse regeneration of the NSR catalyst. For example, the reduction of NO with CO and H$_2$O is shown below in equation (6).

Reduction of NO to NH$_3$ $$2\,NO + 5\,CO + 3\,H_2O \rightarrow 2\,NH_3 + 5\,CO_2 \qquad (6)$$

This property of the NSR catalyst mandates that NH$_3$, which is itself a noxious component, must also now be converted to an innocuous species before the exhaust is vented to the atmosphere.

An alternative strategy for the abatement of NO$_x$ under development of mobile applications (including treating exhaust from lean burn engines) uses selective catalytic reduction (SCR) catalyst technology. The strategy has been proven effective as applied to stationary sources, e.g., treatment of flue gases. In this strategy, NO$_x$ is reduced with a reductant, e.g., NH$_3$, to nitrogen (N$_2$) over an SCR catalyst that is typically composed of base metals. This technology is capable of NO$_x$ reduction greater than 90%, thus it represents one of the best approaches for achieving aggressive NO$_x$ reduction goals.

Ammonia is one of the most effective reductants for NO$_x$ at lean condition using SCR technologies. One of the approaches being investigated for abating NO$_x$ in diesel engines (mostly heavy duty diesel vehicles) utilizes urea as a reductant. Urea, which upon hydrolysis produces ammonia, is injected into the exhaust in front of an SCR catalyst in the temperature range 200-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

Emissions control treatment systems that utilize the catalytic reduction of $NO_x$ in the exhaust to generate $NH_3$, in place of an external reservoir of $NH_3$ or $NH_3$ precursor are known in the art. In other words, a portion of the $NO_x$ component of the exhaust is used as an $NH_3$ precursor in such systems. For instance, U.S. Pat. No. 6,176,079 discloses a method for treating an exhaust gas from a combustion system that is operated alternately in lean and rich conditions. In the method, nitrogen oxides are intermediately stored during lean operation, and released during rich operation to form $NH_3$ that is stored. The stored $NH_3$ can be released, and thereby reduce nitrogen oxides during a subsequent lean operation.

Selective catalytic reduction of $NO_x$ using hydrocarbons (HC-SCR) has been studied extensively as a potential alternative method for the removal of $NO_x$ under oxygen-rich conditions. Ion-exchanged base metal zeolite catalysts (e.g., Cu—ZSM5) have typically not been sufficiently active under typical vehicle operating conditions, and are susceptible to degradation by sulfur dioxide and water exposure. Catalysts employing platinum-group metals (e.g., $Pt/Al_2O_3$) operate effectively over a narrow temperature window and are highly selective towards $N_2O$ production.

Catalytic devices using alumina-supported silver ($Ag/Al_2O_3$) have received attention because of their ability to selectively reduce $NO_x$ under lean exhaust conditions with a wide variety of hydrocarbon species. In addition, diesel fuel could also be used as a reductant. Diesel fuel does not require additional tanks for diesel-powered vehicles. The diesel fuel can be supplied to the emissions treatment system by changing engine management or by supplying an additional injector of diesel fuel to the emission treatment system.

Although $Ag/Al_2O_3$ catalysts are effective to convert $NO_x$ to nitrogen at lean conditions, by using SCR as a hydrocarbon reductant, it would be desirable to extend the temperature range of SCR activity of such catalysts to lower temperatures. As noted above, catalysts employing platinum-group metals (e.g., $Pt/Al_2O_3$) operate effectively over a narrow temperature window and are highly selective towards $N_2O$ production. The temperature window for the platinum catalysts is lower than the temperature window for silver catalysts. However, the major product of the hydrocarbon SCR reaction with Pt catalysts is $N_2O$ which is undesirable because it is a pollutant and a potent green house gas. Thus, it is desired to have a catalyst that would be effective at low temperatures but does not produce $N_2O$. Such a catalyst could be useful in emissions control systems in combination with catalysts, in the same or different monoliths, that have high temperature SCR activity.

SUMMARY OF THE INVENTION

In accordance with an embodiment of the invention, a catalyst for reducing NOx emissions from an exhaust gas stream of a lean burn engine is provided, which comprises combinations of silver and platinum supported on alumina.

The catalyst may, according to one embodiment, further comprise a platinum group metal such as a platinum composition impregnated in the support. In certain embodiments, the atomic fraction of the platinum group metal (ratio of platinum group metal to a combination of a platinum group metal and silver) is less than or equal to about 0.25, and more particularly, 0.20. In a specific embodiment, the atomic fraction of the platinum group metal is less than or equal to about 0.10. According to one or more embodiments, the catalyst contains less than about 1% platinum by weight, for example, less than or equal to about 0.75% platinum by weight, and more particularly, less than about 0.50% by weight.

Another aspect of the invention pertains to an emissions treatment system for an exhaust stream comprising a catalyst according to the embodiments described above. The emissions treatment system may, according to one embodiment, comprise a catalytic device which receives an exhaust gas feedstream that is lean of stoichiometry and further receives a reducing agent selected from at least one of a hydrocarbon fuel, carbon monoxide and hydrogen into the exhaust stream upstream of the catalyst to form a rich gaseous stream.

The catalyst may be disposed on a ceramic or metallic honeycomb flow through substrate. The emission treatment system may further include a two or more catalysts disposed on two or more ceramic or metallic honeycomb flow through substrate. In one or more embodiments, the emissions treatment system may further comprise a component selected from diesel oxidation catalyst, a catalyzed soot filter, a soot filter, a $NO_x$ trap, partial hydrocarbon oxidation catalyst, a sulfur trap, a precious metal catalyst disposed on a substrate, a phosphorus trap, and combinations or one or more thereof.

According to one or more embodiments of the emission treatment system, the catalyst is disposed on a soot filter and functions as a hydrocarbon SCR catalyst. In one or more embodiments, the soot filter is a wall flow filter. According to one embodiment, the soot filter is a wall flow filter comprising an inlet end, an outlet end and internal walls extending from the inlet end to the outlet end and defining a plurality of passages comprising inlet channel sides and outlet channel sides with alternate channels comprising inlet channels having open inlets and plugged outlets and outlet channels having open outlets and plugged inlets, wherein the catalyst is disposed on the outlet channel side. As a variant on this embodiment, the system may further include an NSR catalyst which extends from the inlet end for at least part of the distance from the open inlet toward the plugged outlet, and the SCR catalyst extends from the outlet end for at least part of the distance from the open outlet toward the plugged outlet. According to one embodiment, there is an inlet oxidation catalyst disposed as a layer on part of the NSR catalyst and extends from the inlet end for at least part of the distance from the open inlet toward the plugged outlet, and/or there is an outlet oxidation catalyst disposed as a layer on part of the SCR catalyst and extends from the outlet end for at least part of the distance from the open outlet toward the plugged outlet.

Another aspect of the invention pertains to a method of preparing a catalyst comprising providing a support comprising alumina, preferably a surface hydroxylated alumina; impregnating the support with a silver compound and a platinum compound; drying the impregnated support; and calcining the impregnated support. The method may further include subjecting the resulting material to hydrothermal treatment. The platinum may be impregnated separately from the silver or it may be co-impregnated with the silver. Co-impregnation appears to produce better results than separate or sequential impregnation.

According to one embodiment, the calcining is performed at a temperature of about 540° C. or higher. The calcining may be performed for about 1 to 48 hours. In another embodiment, the hydrothermal treatment is performed in at least about 10% steam in air. The hydrothermal treatment can be carried out in the temperature ranging from about 400° C. to 700° C., preferably at about 650° C., for about 1 to 48 hours. This treatment is generally carried out in an air stream containing about 10% steam for at least about 1 hour, and typically about 16 hours.

According to an embodiment of the invention, the silver is impregnated in an amount of between about 1% and 4% by weight on an oxide basis.

The deposition of metals onto the surface of alumina can be achieved by various impregnation methods, including incipient wetness and wet impregnation. In the wet impregnation process, an excess amount of solution is mixed with the support, followed by evaporation of the excess liquid. The deposition of metals can also be achieved by other coating techniques such as chemical vapor deposition.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF EMBODIMENTS OF THE INVENTION

Figure 1:
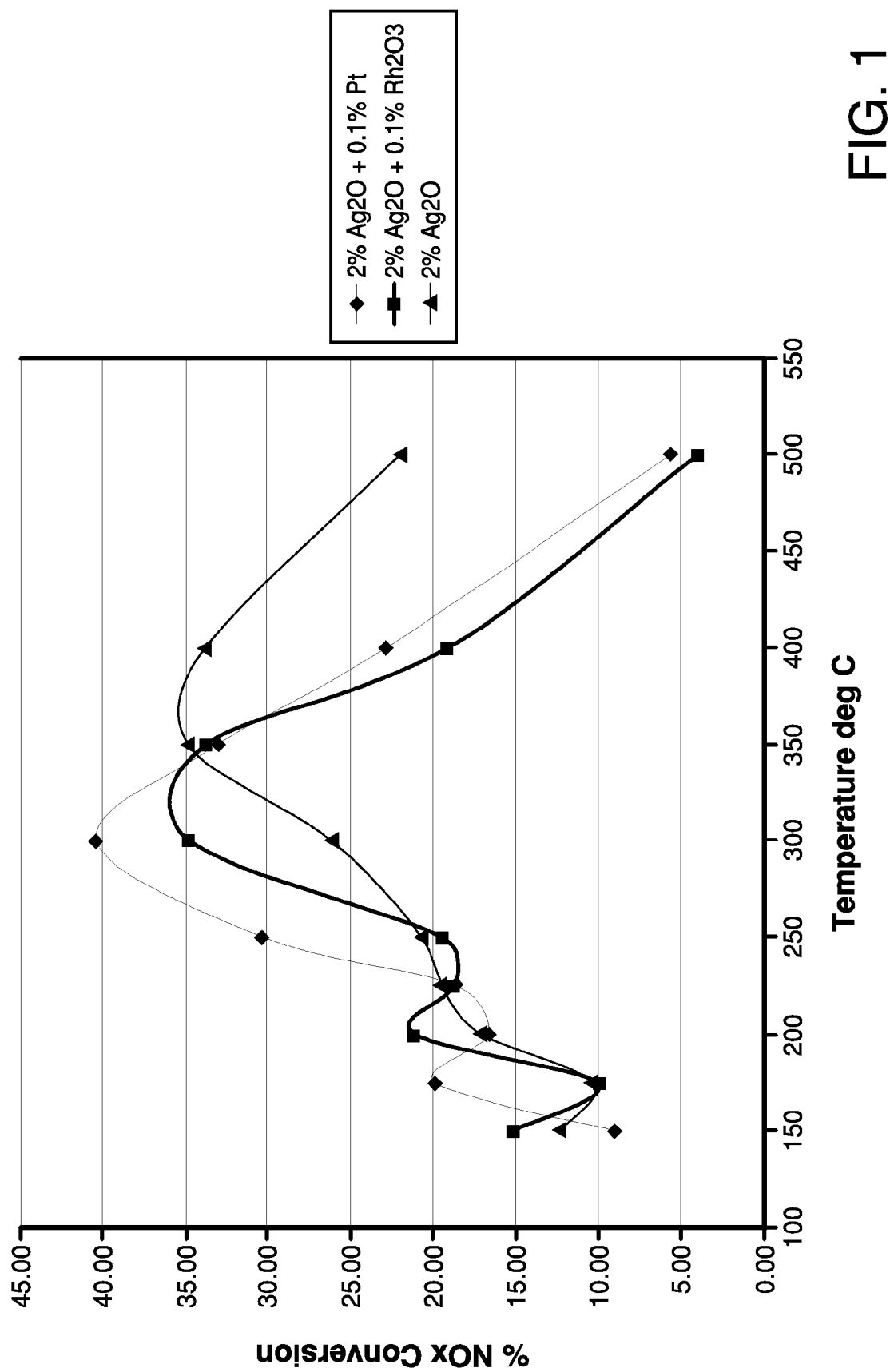
FIG. 1 is a graph showing the performance of catalyst samples containing silver, silver and platinum, and silver and rhodium.

Before describing several exemplary embodiments of the invention, it is to be understood that the invention is not limited to the details of construction or process steps set forth in the following description. The invention is capable of other embodiments and of being practiced in various ways.

An exemplary catalyst comprises about 2 to 4 weight % silver, on an $Ag_2O$ basis, and a platinum-group metal supported on alumina. In one embodiment, the catalyst is prepared by depositing ionic silver on highly hydroxylated alumina.

Thus, according to one or more embodiments, a catalyst for reducing $NO_x$ emissions from an exhaust gas stream of a lean burn engine is provided which comprises silver and a platinum group metal supported on alumina which is prepared by impregnating ionic silver on a surface hydroxylated alumina support. As used herein, the term "hydroxylated" means that the surface of the alumina has surface hydroxyl groups in the alumina as it is obtained, for example boehmite, pseudoboehmite or gelatinous boehmite, diaspore, nordstrandite, bayerite, and gibbsite.

According to one or more embodiments, a surface hydroxylated alumina support is used as the support. As used herein, the term "hydroxylated" means that the surface of the alumina has surface hydroxyl groups in the alumina as it is obtained, for example boehmite, pseudoboehmite or gelatinous boehmite, diaspore, nordstrandite, bayerite, and gibbsite. Pseudoboehmite and gelatinous boehmite are generally classified as non-crystalline or gelatinous materials, whereas diaspore, nordstrandite, bayerite, gibbsite, and boehmite are generally classified as crystalline. According to one or more embodiments of the invention, the hydroxylated alumina is represented by the formula $Al(OH)_xO_y$ where $x=3-2y$ and $y=0$ to 1 or fractions thereof. In their preparation, such aluminas are not subject to high temperature calcination, which would drive off many or most of the surface hydroxyl groups.

According to embodiments of the present invention, substantially non-crystalline hydroxylated aluminas in the form of flat, plate-shaped particles, as opposed to needle-shaped particles, are useful in preparing catalysts. The shape of the hydroxylated alumina used in one or more embodiments of the present invention is in the form of a flat plate and has an average aspect ratio of 3 to 100 and a slenderness ratio of a flat plate surface of 0.3 to 1.0. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or a Transmission Electron Microscope (TEM). The slenderness ratio means a ratio of a minimum diameter to a maximum diameter of the flat plate surface when observed in the same manner as in the aspect ratio.

Hydroxylated, flat, plate-shaped particulate aluminas which may be used in producing the catalysts according to embodiments of the invention are known and commercially available. Processes for producing them are also known. Exemplary processes for producing pseudoboehmite are described in, for example, U.S. Pat. No. 5,880,196 and PCT International Application No. WO 97/22476.

Pseudoboehmite has a boehmite-like structure. The X-ray diffraction pattern, however, consists of very diffuse bands or halos. The spacings of the broad reflections correspond approximately with the spacings of the principal lines of the pattern of crystalline boehmite, but the first reflection, in particular, commonly shows appreciable displacements to values as large as 0.66 to 0.67 nanometer compared with the 0.611 nanometer reflection for the 020 line for boehmite. It has been suggested that although the structure resembles that of boehmite in certain respects, the order is only of very short range. It is generally accepted by those skilled in the art that pseudoboehmite is a distinct phase which is different from boehmite. See Encyclopedia of Chemical Technology, $5^{th}$ Ed., Vol. 2, Wiley Inter science, 2004, pages 421-433, and "Oxides and Hydroxides of Aluminum," Alcoa Technical Paper No. 19, Revised, by Karl Wefers and Chanakya Misra, 1987, Copyright Aluminum Company of America.

Alternatively, a calcined alumina could be treated in a manner to add surface hydroxyl groups, for example, by exposing the alumina to steam for a period of time. In one or more embodiments, the alumina used for silver impregnation is substantially free of gamma alumina. The final catalyst after silver impregnation, drying, calcination, and/or hydrothermal treatment, may comprise gamma alumina or other high temperature alumina phases.

In a specific embodiment of the invention, a catalyst comprises silver and a precious metal (PM) such as platinum, rhodium, iridium, ruthenium, palladium or mixtures thereof impregnated on the support. In one or more embodiments, the atomic fraction of PM (i.e. the ratio of PM to a combination of precious metal and silver is less than or equal to about 0.25. In certain embodiments, the atomic fraction is less than or equal to about 0.0.20. In a specific embodiment, the atomic fraction a combination of PM and silver is less than or equal to about 0.10. According to one or more embodiments, the catalyst contains less than about 1% platinum by weight, for example, less than or equal to about 0.75% platinum by weight, and more particularly, less than about 0.50% by weight.

Preparation of Catalyst Compositions

A 1M solution of silver nitrate (purchased from Aldrich Chemical Company) is prepared using deionized water. The resulting solution is stored in a dark bottle to protect it from light. Platinum, rhodium and palladium salt solutions were obtained from Engelhard Corporation, Iselin, N.J.

One aspect of the invention pertains to methods of preparing catalysts and catalyst compositions. Thus, an alumina, particularly, a hydroxylated alumina is impregnated with silver and a platinum-group metal as described below.

As noted above, suitable aluminas include boehmite or pseudo boehmite/gelatinous alumina and surface area of at least about 20 $m^2/g$. According to one or more embodiments, the hydroxylated alumina is substantially free of gamma alumina. Impregnating the hydroxylated alumina with a water soluble, ionic form of silver such as silver acetate, silver nitrate, etc., as well as a salt of a platinum-group metal, and then drying and calcining the impregnated alumina and then activating the catalysts by calcining at a temperature low enough to fix the metals and decompose the anion (if possible). Typically for the nitrate salts this would be about 450-550 degrees centigrade.

It may also be desired to modify the hydroxylated alumina prior to impregnation with silver and a platinum-group metal. This can be accomplished utilizing a variety of chemical reagents and/or processing treatments such as heat or steam treatments to modify the alumina surface properties and/or physical properties. This modification of the alumina properties may improve the performance properties of the catalyst for properties such as activity, stability, metal dispersion, sintering resistance, resistance to sulfur and other poisoning, etc. However, the processing should be performed so that chemical modification of the alumina surface does not substantially negatively impact the metal-alumina interaction.

Emissions Treatment Systems

The emission treatment systems according to one or more embodiments of the invention may include the silver and precious metal on alumina $NO_x$ reduction catalyst described above and various other components. Thus, the silver on alumina catalyst may be contained on multiple monoliths or substrates with one or more of the substrates containing in part or entirely the silver and precious metal on alumina catalyst. The silver and precious metal on alumina catalyst may be used in a hydrocarbon SCR (HC SCR) system where the hydrocarbons are supplied by engine controls or engine management. Alternatively, the silver and precious metal on alumina catalyst may be used in an HC SCR system in which the hydrocarbons are supplied by a separate injection device. In another embodiment, an HC SCR system can have hydrogen added to the exhaust system, for example using a $PO_x$ reactor, an on board supply of hydrogen, or by using compounds or complexes that release hydrogen when they are decomposed. An HC SCR system may be provided in which 1% or more of the reductant contains an oxygenated carbon-containing molecule such as an aldehyde, alcohol or carbon monoxide. The $NO_x$ catalysts described above may be part of a system that includes one or more additional components of an exhaust system including, but not limited to diesel oxidation catalysts, catalyzed soot filters, soot filters, $NO_x$ traps, NSR catalysts, partial hydrocarbon oxidation catalysts, air pumps, external heating devices, precious metal catalysts, sulfur traps, phosphorous traps, etc.

The emissions treatment system can include the silver and a platinum-group metal on alumina catalyst described above to treat $NO_x$. The silver and a platinum-group metal on alumina catalyst can be located downstream of an NSR catalyst. The silver and a platinum-group metal on alumina catalyst can be in the form of self-supporting catalyst particles or as a honeycomb monolith formed of the SCR catalyst composition. In one or more embodiments, the silver and a platinum-group metal on alumina catalyst composition is disposed as a washcoat or as a combination of washcoats on a ceramic or metallic substrate, preferably a honeycomb flow through substrate.

According to one or more embodiments, when deposited on the honeycomb monolith substrates, such silver and a platinum-group metal on alumina catalyst compositions are deposited at a concentration of at least 1 $g/in^3$ to ensure that the desired $NO_x$ reduction is achieved and to secure adequate durability of the catalyst over extended use. In one embodiment, there is at least 1.6 g $in^3$ of SCR composition, and in particular, there is at least 1.6 to 5.0 $g/in^3$ of the SCR composition disposed on the wall flow monolith.

Substrates

In one or more embodiments, one or more catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). Either NSR and/or SCR catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Preparation of Washcoats

The catalyst compositions according to embodiments of the present invention may be readily prepared by processes well known in the prior art. A representative process for preparing a bi-layer washcoat set forth below. It will be understood that the process below can be varied according to different embodiments of the invention to prepare single layer washcoats, by omitting the step of applying the second layer, or to add one or more additional layers to the bi-layer washcoat described below.

The catalyst composite can be readily prepared in one or more layers on a monolithic honeycomb substrate. For a bi-layer washcoat, the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. Components such as the silver metals, precious metals or platinum group metals, transition metal oxides, stabilizers, promoters and the $NO_x$ sorbent component may be incorporated in the slurry as a mixture of water soluble or water-dispersible compounds or complexes. Thereafter, the coated substrate is typically calcined by heating, e.g., at 400 to 600° C. for 1 to 3 hours.

In one or more embodiments, the slurry is thereafter comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 35-45 wt. %.

Each layer thereafter prepared and deposited on the previously formed layer of the calcined composite in a manner similar to that described above. After all coating operations have been completed, the composite is then again calcined by heating, e.g., at 400 to 600° C. for 1-3 hours.

The following examples further illustrate the present invention, but of course, should not be construed as in any way limiting its scope.

EXAMPLES

Catalyst Preparation

The catalysts were prepared as described above by either sequential impregnation or co-impregnation.

Co-impregnation Procedure

Catalysts were prepared by standard incipient wetness impregnation techniques using the following procedure. The available pore volume of the hydroxylated alumina support was determined by titrating the bare support with water, while mixing, until incipient wetness was achieved. This results in a determination of the liquid volume capacity per gram of support.

The amount (volume) of PM and Ag solutions needed to achieve the target compositions and target PM/Ag ratio is determined for the amount of support being used. The total volume capacity of the support is calculated from the incipient wetness determination described above. The difference between the volumes of PM and silver solutions needed and the volume capacity of the support sample is determined.

The amount of 1M silver nitrate solution needed to achieve the target composition is placed in a container and a volume of water equal to the difference between the volumes of PM and Ag solutions needed and the volume capacity of the support sample is added to the Ag solution. Then while mixing the silver nitrate/water solution the desired amount of PM solution is added slowly. Once the solutions are completely mixed, the resulting Ag-PM solution is combined with the support sample and the two components are mixed until the resulting material is homogeneous.

The resulting solid is dried at about 90° C. for about 16 hours, then calcined at 540° C. for about 2 hours. The resulting solid is hydrothermally treated at about 650° C. in flowing air with about 10% steam for at least about 1 hour, typically about 16 hours. Alternatively, the calcined solid is dip coated onto a 400 cell per $in^2$ cordierite monolith by standard procedures to a washcoat loading of between about 2 and about 4.0 $g/in^3$. The coated monolith can then be hydrothermally treated at about 650° C. in flowing air with about 10% steam for at least about 1 hour, typically about 16 hours.

Sequential Impregnation Procedure

Silver nitrate and platinum nitrate solutions described above in the co-impregnation procedure were used. In addition, the liquid volume capacity per gram of support was determined for the support as described above.

From the target $Ag_2O$ composition of the final catalyst, the amount of silver nitrate solution needed to obtain the desired $Ag_2O$ level is calculated and measured into a container. Enough deionized water is added to the solution to achieve the liquid volume needed to fill the capacity of the support sample using the value for the liquid volume capacity per gram of support. The resulting solution was added to a hydroxylated alumina support with mixing until the sample is homogeneous. The resulting material was dried at about 90° C. for about 16 hours and then calcined at about 540° C. for 2 hours.

The second metal target concentration is determined and the amount of metal salt solution needed to achieve the target level is calculated. This is measured into a container and enough deionized water is added to the solution to achieve the liquid volume needed to fill the capacity of the support sample using the value for the liquid volume capacity per gram of support. The resulting solution was added to the hydroxylated alumina support with mixing until the sample is homogeneous. The resulting material was dried at about 90° C. for about 16 hours and then calcined at about 540° C. for 2 hours.

The resulting solid may be optionally hydrothermally treated at about 650° C. in flowing air with about 10% steam for about 16 hours. Alternatively, the calcined solid is dip coated onto a 400 cell per $in^2$ cordierite monolith by standard procedures to a washcoat loading of between about 2.0 about 3.2 $g/in^3$. The coated monolith can then be hydrothermally treated at about 650° C. in flowing air with about 10% steam for about 16 hours.

Catalyst Evaluation

Catalyst performance was evaluated in two ways. The first option involves using a microchannel catalytic reactor containing a bed of approximately 12.6 $mm^3$ of catalyst. The flow rate (standard temperature and pressure) of 15 sccm of reactants (at the concentration shown in Table 1, below) plus 0.75 sccm steam was passed over the bed at various temperatures (150, 175, 200, 225, 250, 300, 350, 400, 500° C.) to determine the reactivity of the catalyst. Conversion of $NO_x$ was determined by $100*(NO_x \text{ fed}-NO_x \text{ out})/(NO_x \text{ fed})$ using a mass spectral analyzer.

TABLE 1

| Species | Concentration |
|---|---|
| $NO_x$ | 400 ppm |
| $O_2$ | 10% |
| $CO_2$ | 5% |
| HC (C1) | 4000 ppm |
| C1/N | 10 |
| CO | 745 ppm |
| $H_2$ | 245 ppm |
| He | Balance |
| $H_2O$ as % of dry Air flow | 5% |

Catalysts were also evaluated by washcoating the catalyst powder onto a small cylindrical cordierite monolith (¾" diameter×1.0" length) of 400 cells/in³ by dip-coating the monolith into an aqueous slurry of the catalyst by standard techniques. Final catalyst loading was typically 2.5-3.0 g/in³. Catalysts are compared in the examples below at similar loadings and equivalent space velocities.

Analysis of the performance of these samples was accomplished using a tubular flow through reactor. A simulated exhaust gas feedstream was passed through a sample of the catalyst on 400 cell-per-square inch cordierite monolith substrate, using simulated diesel fuel 67% n-dodecane and 33% m-xylene by liquid volume). The reactor system was instrumented with appropriate sensors, including a Fourier transform infrared spectrometer to determine $NO_x$ concentration levels (and other species) entering/exiting the SCR catalyst, and a flow meter to determine exhaust flow rate translatable to catalyst space velocity (SV). Space velocity represents a rate of feed of gas, in volume, per unit volume of the catalyst, and has a unit of inverse hour ($h^{-1}$). Baseline laboratory conditions included the following standard gases in the simulated exhaust feedstream: 10% $O_2$, 5% $CO_2$, 5% $H_2O$, 750 parts per million (hereinafter 'ppm') CO, and 250 ppm $H_2$.

Example 1

Three catalysts were prepared by impregnating metals onto a pseudoboehmite support as described above. One catalyst (control) contained 2 wt % $Ag_2O$, the second contained 2 wt % $Ag_2O$ and 0.1 wt % Pt (as the metal for purposes of specifying the composition). The third catalyst was 2 wt % $Ag_2O$ plus 0.1 wt % $Rh_2O_3$ on the same support. All samples were hydrothermally treated at 650° C. for 16 hours. The materials were evaluated in the microchannel reactor using n-octane as the reductant. The results are shown in FIG. 1. Both catalysts containing PM had conversion maxima and operational ranges at lower temperatures than the silver catalyst control.

Example 2

The catalysts in the table below were prepared by the procedures described above and coated onto ¾ inch diameter by 1 inch long cylindrical cordierite monoliths (400 cells per square inch). All coated samples were hydrothermally treated at 650° C. for 16 hours.

| Sample # | Wt % Ag2O | Wt % Pt | atomic ratio PM/Ag | atomic fraction PM/(PM + Ag) | Loading g/in³ | Method |
|---|---|---|---|---|---|---|
| A | 2.00 | 0.05 | 0.0148 | 0.015 | 2.57 | sequential |
| B | 2.00 | 0.10 | 0.0297 | 0.029 | 2.39 | sequential |
| C | 2.00 | 0.60 | 0.1782 | 0.151 | 2.95 | Co-Imp |
| D | 3.00 | 0.23 | 0.0455 | 0.044 | 2.64 | Co-Imp |
| E | 3.00 | 0.45 | 0.0891 | 0.082 | 2.50 | Co-Imp |
| F | 2.00 | 0.04 | 0.0119 | 0.012 | 2.80 | Co-Imp |
| G | 2.00 | 0.15 % Pd | 0.0446 | 0.043 | 2.45 | Co-Imp |
| H | 2.00 | 0.08 | 0.0436 | 0.042 | 2.73 | Co-Imp |

Figure 2:
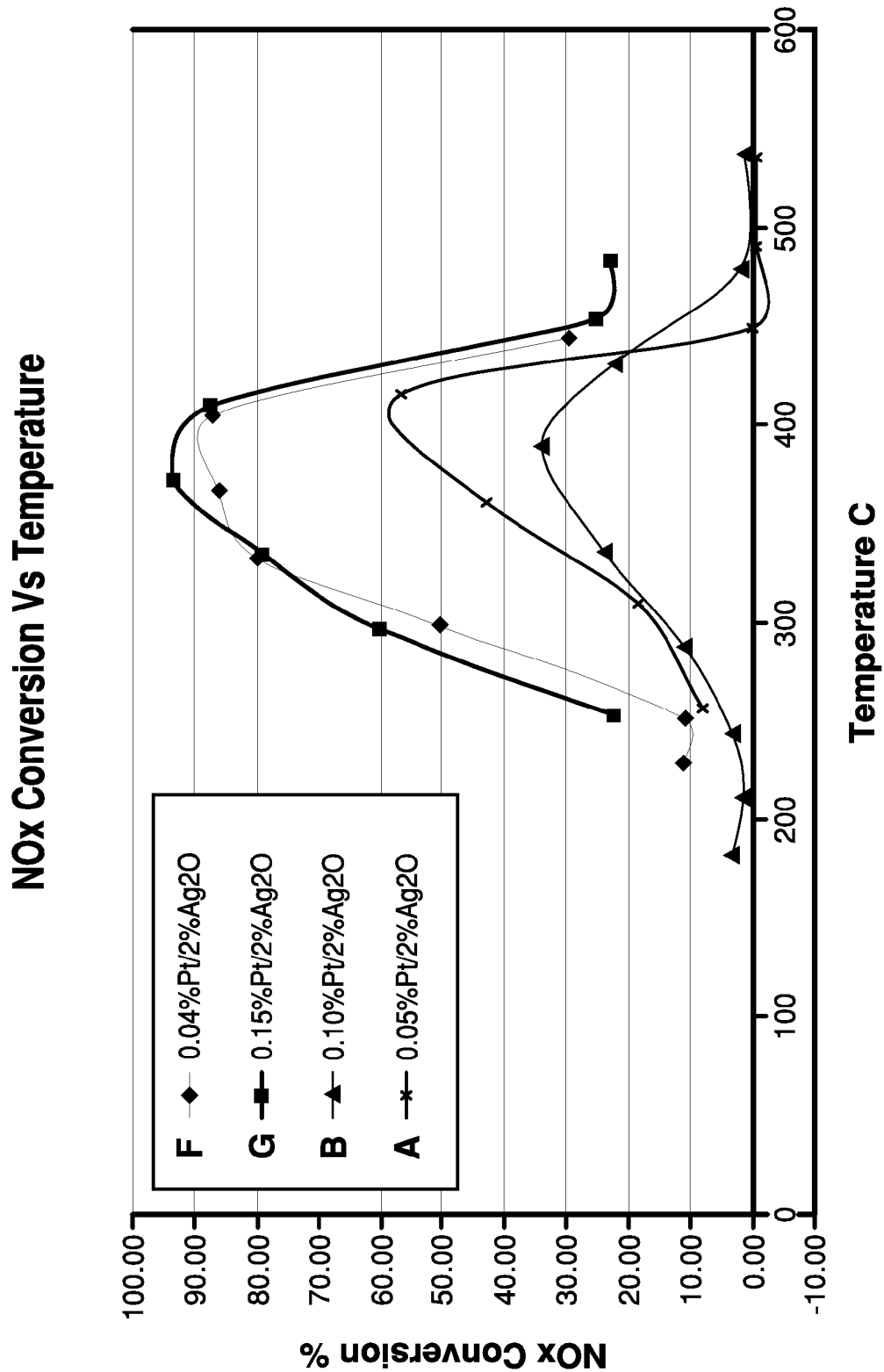
FIG. 2 is a graph showing the performance of catalyst samples containing silver and different levels of platinum, either sequentially loaded or impregnated into the support.

The performance of these catalysts were evaluated using the laboratory tubular reactor as described above using simulated diesel fuel as the reductant and a space velocity of 12500 hr-1, and a feed concentration of NO of 100 ppm with a ratio of C1:N=8. FIG. 2 shows results for samples (A, B, G and F in Table 1.) A and B were prepared by sequential addition and G and F were co-impregnated. onto the support. The co-impregnated catalysts were clearly superior and the temperature window for maximum $NO_x$ conversion moved to lower temperatures. Little or no $N_2O$ formation was observed. The overall conversion maximum for the co-impregnated samples were similar to a silver only catalyst which would have peak conversions at greater than 400° C. of 80% or greater.

Figure 3:
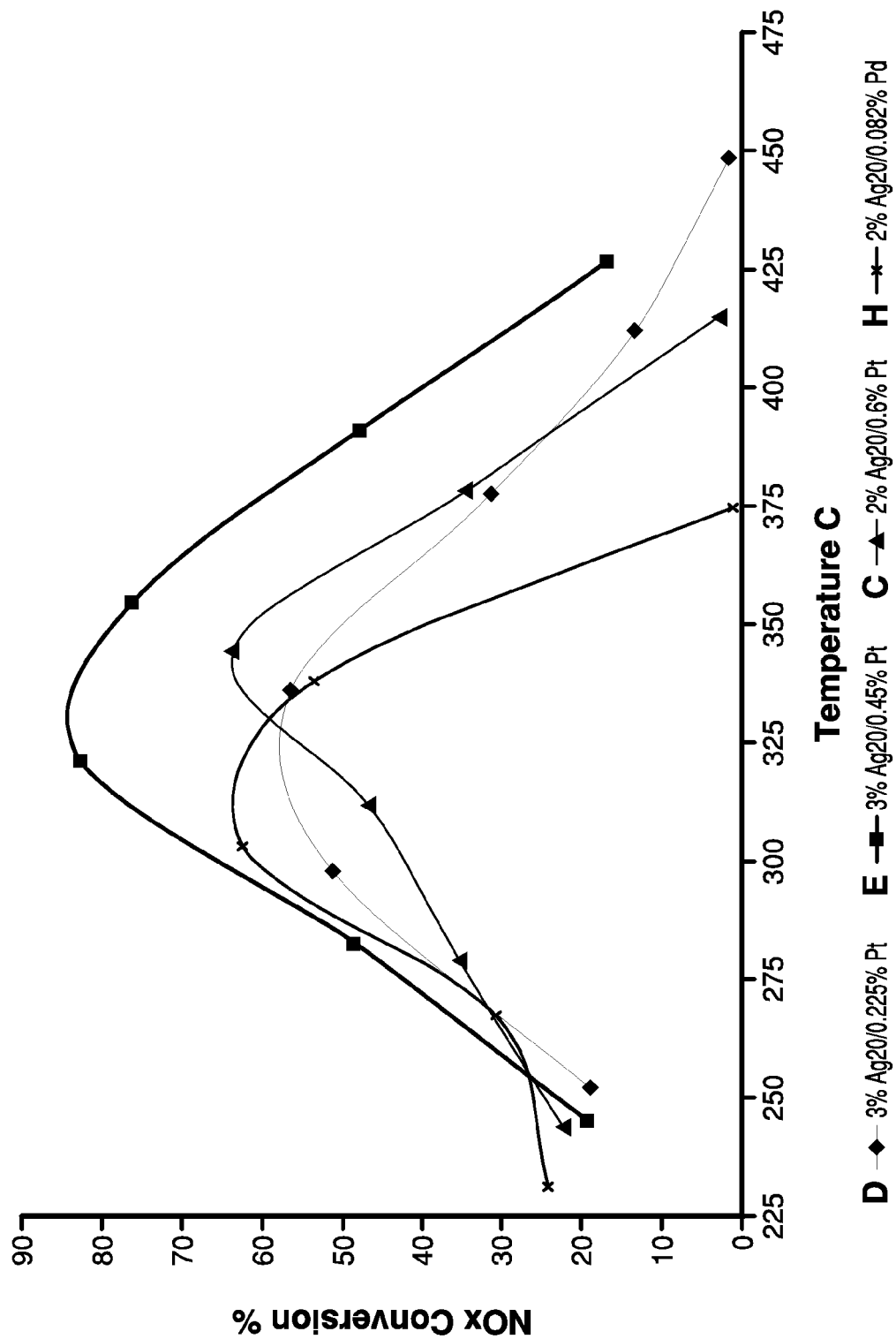
FIG. 3 is a graph showing the performance of several catalyst samples containing silver and a platinum group metal.
Figure 4:
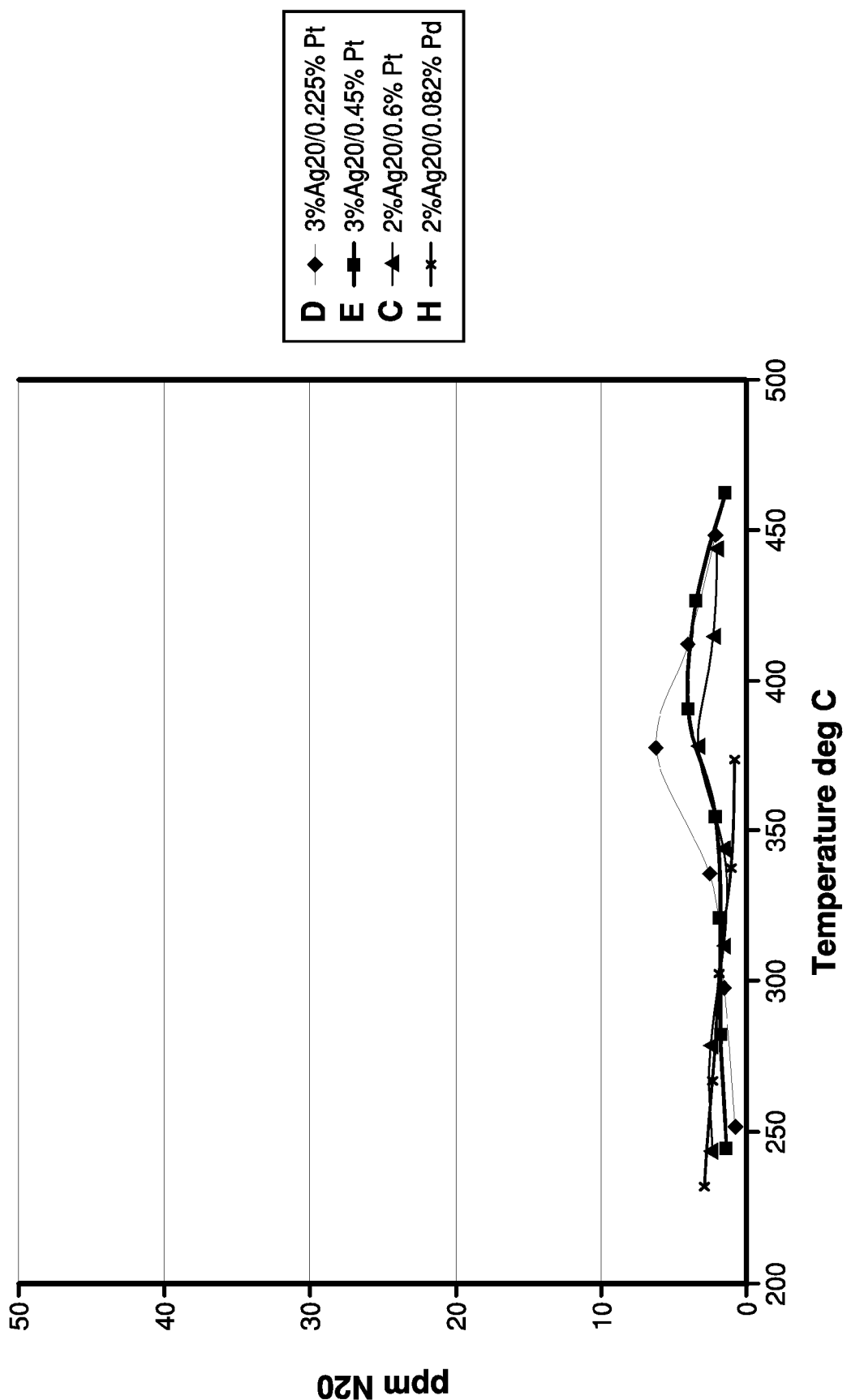
FIG. 4 is a graph showing the N2O formation levels in ppm of catalyst samples of FIG. 3 containing silver and a platinum group metal.

The remaining catalysts from the table (C, D, E and H) were prepared by the co-impregnation technique as described above. Performance testing of these materials in the laboratory tubular reactor is shown in FIGS. 3 and 4. FIG. 3 shows that these materials also had effective temperature windows at lower temperatures than silver catalysts. FIG. 4 shows that the catalysts had little or no $N_2O$ formation. Typically, 50% or more of the $NO_x$ in the exhaust gas stream under lean gas conditions (where lambda is greater than 1) is converted to $N_2O$. However, according to embodiments of the present invention, and as shown by samples C, D, E and H in FIG. 4, less than 30%, for example, less than 20%, specifically, less than 10% of the $NO_x$ is converted to $N_2O$ under lean exhaust conditions in which lambda is greater than 1. As is known in the art, the symbol λ (lambda) is thus used to represent the result of dividing a particular air/fuel (A/F) ratio by the stoichiometric A/F ratio for a given fuel, so that, lambda=1 is a stoichiometric mixture, lambda>1 is a fuel-lean mixture and lambda<1 is a fuel-rich mixture. As shown in FIG. 4, the conversion efficiency of $NO_x$ to $N_2O$ was less than 30% at a temperature range between about 250° C. to 450° C. As will be understood by the skilled artisan, the percent of $NO_x$ converted to $N_2O$ is based upon the amount of $NO_x$ reacted with the catalyst. In other words, not all of the $NO_x$ passing through the catalyst reacts with the catalyst.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed:

1. A catalyst for reducing $NO_x$ emissions from an exhaust gas stream of a lean burn engine consisting essentially of silver and a platinum group metal dispersed on alumina particles, the atomic fraction of the platinum group metal is less than or equal to about 0.25, wherein the atomic fraction of the platinum group metal is the ratio of platinum group metal to a combination of a platinum group metal and silver and the catalyst is effective to reduce NOx emissions from an exhaust gas stream of a lean burn engine.

2. The catalyst of claim 1, having a $NO_x$ to $N_2O$ conversion efficiency less than about 30% of $NO_x$ reacted with the catalyst under lean exhaust gas conditions having a lambda greater than 1.0.

3. The catalyst of claim 1, having a $NO_x$ to $N_2O$ conversion efficiency less than about 30% of $NO_x$ reacted with the catalyst under lean exhaust gas conditions having a lambda greater than 1.0 and a temperature between about 250° C. to 450° C.

4. The catalyst of claim 1, wherein the atomic fraction of the platinum group metal is less than or equal to about 0.20.

5. The catalyst of claim 1, wherein the atomic fraction of the platinum group metal is less than or equal to about 0.10.

6. The catalyst of claim 1, wherein the platinum group metal is selected from the group consisting of platinum, rhodium, iridium, ruthenium, palladium and combinations thereof.

7. The catalyst of claim 1, wherein the catalyst is substantially free of silver aluminate.

8. The catalyst of claim 1, wherein the catalyst is prepared by impregnation of ionic silver and the platinum group metal on the surface of a hydroxylated alumina particles.

9. The catalyst of claim 8, wherein the surface hydroxylated alumina is selected from the group consisting of boehmite, pseudo boehmite or gelatinous boehmite, diaspore, nordstrandite, bayerite, gibbsite, alumina having hydroxyl groups added to the surface, and mixtures thereof.

10. The catalyst of claim 8, wherein the hydroxylated alumina includes pseudoboehmite.

11. The catalyst of claim 8, wherein the silver and the platinum are co-impregnated on the hydroxylated alumina particles.

12. The catalyst of claim 1, wherein the silver is well dispersed on the alumina particles.

13. The catalyst of claim 1, wherein the catalyst is disposed on a soot filter and functions as a hydrocarbon selective catalytic reduction catalyst.

14. The catalyst of claim 13, wherein the soot filter is a wall flow filter comprising an inlet end, an outlet end and internal walls extending from the inlet end to the outlet end and defining a plurality of passages comprising inlet channel sides and outlet channel sides with alternate channels comprising inlet channels having open inlets and plugged outlets and outlet channels having open outlets and plugged inlets.

15. The catalyst of claim 14, wherein catalyst is disposed on the outlet channel side of the wall flow filter.

16. The catalyst of claim 1, wherein the catalyst is disposed on a honeycomb flow through substrate.

17. A catalyst for reducing $NO_x$ emissions from an exhaust gas stream of a lean burn engine consisting essentially of silver and a platinum group metal dispersed on alumina particles and having a $NO_x$ to $N_2O$ conversion efficiency less than about 30% of $NO_x$ reacted with the catalyst under lean exhaust gas conditions having a lambda greater than 1.0.

* * * * *